(12) United States Patent
Narematsu et al.

(10) Patent No.: US 11,597,367 B2
(45) Date of Patent: Mar. 7, 2023

(54) HYDRAULIC BRAKE SYSTEM

(71) Applicant: TOYOTA JIDOSHA KABUSHIKI KAISHA, Toyota (JP)

(72) Inventors: Tomohiro Narematsu, Nisshin (JP); Osamu Kawarada, Nagoya (JP); Yu Asai, Kuwana (JP); Yasuhiro Tajima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 16/785,031

(22) Filed: Feb. 7, 2020

(65) Prior Publication Data
US 2020/0290583 A1 Sep. 17, 2020

(30) Foreign Application Priority Data
Mar. 14, 2019 (JP) .............................. JP2019-046934

(51) Int. Cl.
*B60T 8/40* (2006.01)
*B60T 13/20* (2006.01)
(Continued)

(52) U.S. Cl.
CPC ................ *B60T 13/20* (2013.01); *B60T 7/12* (2013.01); *B60T 8/17* (2013.01); *B60T 13/686* (2013.01); *B60T 13/161* (2013.01); *B60T 13/62* (2013.01); *B60T 2201/02* (2013.01); *B60T 2270/402* (2013.01); *B60T 2270/404* (2013.01);
(Continued)

(58) Field of Classification Search
CPC ..... B60T 8/88; B60T 8/92; B60T 8/94; B60T 8/4077; B60T 2270/402; B60T 2270/403; B60T 2270/414; B60T 13/745; B60T 13/662; B60T 13/686; B60T 7/22; B60T 8/404; B60T 8/405; B60T 8/4054; B60T 8/4059; B60T 13/161; B60T 13/20; B60T 7/12; B60T 8/17; B60T 2270/413; B60T 17/22
See application file for complete search history.

(56) References Cited

U.S. PATENT DOCUMENTS

2007/0188019 A1    8/2007  Maki et al.
2011/0077831 A1*   3/2011  Nishino ................ B60T 13/662
                                                        701/70

(Continued)

FOREIGN PATENT DOCUMENTS

CN    102421644 A    4/2012
CN    104334426 A    2/2015
(Continued)

*Primary Examiner* — Robert A. Siconolfi
*Assistant Examiner* — Stephen M Bowes
(74) *Attorney, Agent, or Firm* — Sughrue Mion, PLLC

(57) ABSTRACT

In a hydraulic brake system, when a main power supply is in an abnormal condition in which it cannot supply electric power to a pump motor, etc., the pump motor is operated with electric power supplied from an auxiliary power supply, irrespective of the presence of a braking request. Thus, when the main power supply is in the abnormal condition, the number of times inrush current flows is reduced. As a result, the voltage of the auxiliary power supply is less likely to be lower than an operation minimum voltage, and the hydraulic brake system is less likely to be unable to be operated.

2 Claims, 10 Drawing Sheets

(51) Int. Cl.
*B60T 13/68* (2006.01)
*B60T 8/17* (2006.01)
*B60T 7/12* (2006.01)
B60T 13/62 (2006.01)
B60T 13/16 (2006.01)

(52) U.S. Cl.
CPC ... *B60T 2270/413* (2013.01); *B60T 2270/414* (2013.01); *B60T 2270/82* (2013.01)

(56) References Cited

U.S. PATENT DOCUMENTS

| | | | |
|---|---|---|---|
| 2011/0316326 A1* | 12/2011 | Miyazaki | B60T 8/344 303/2 |
| 2011/0316329 A1* | 12/2011 | Nishino | B60T 8/4872 303/14 |
| 2015/0158471 A1* | 6/2015 | Ezoe | B60T 8/58 701/70 |

FOREIGN PATENT DOCUMENTS

| | | | |
|---|---|---|---|
| JP | 2000261982 A * | 9/2000 | |
| JP | 2007-216773 A | 8/2007 | |
| JP | 2017-100599 A | 6/2017 | |
| WO | 2010/113574 A1 | 10/2010 | |

\* cited by examiner

HYDRAULIC BRAKE SYSTEM

INCORPORATION BY REFERENCE

The disclosure of Japanese Patent Application No. 2019-046934 filed on Mar. 14, 2019 including the specification, drawings and abstract is incorporated herein by reference in its entirety.

BACKGROUND

1. Technical Field

The disclosure relates to a hydraulic brake system installed on a vehicle.

2. Description of Related Art

A hydraulic brake system described in Japanese Unexamined Patent Application Publication No. 2007-216773 (JP 2007-216773 A) includes (a) four brake cylinders provided for four wheels as front and rear, right and left wheels, (b) four pumps connected to the four brake cylinders, respectively, (c) two pump motors each of which drives two of the four pumps, (d) four solenoid valve devices corresponding to the four brake cylinders, respectively, and each including one or more solenoid valves, and (e) an on-board power supply that supplies electric power to the two pump motors and the four solenoid valve devices. The on-board power supply includes a main power supply having a battery, and an auxiliary power supply having a capacitor. In the hydraulic brake system, when the main power supply is in an abnormal condition, the two pump motors and the four solenoid valve devices are controlled, using electric power supplied from the auxiliary power supply. However, in this case, the width of the dead zone is increased, to be larger than that in the case where the main power supply is in a normal condition. As a result, when the main power supply is in the abnormal condition, the number of times the pump motors are started and stopped is increased, but the operation time is shortened, as compared with the case where the main power supply is in the normal condition.

SUMMARY

The disclosure provides a hydraulic brake system in which, when a main power supply is in an abnormal condition, the voltage of an auxiliary power supply is less likely to be reduced to be lower than an operation minimum voltage of the hydraulic brake system.

In the hydraulic brake system according to this disclosure, when the main power supply is in an abnormal condition in which it cannot supply electric power to a pump motor, etc., the pump motor is operated, irrespective of the presence or absence of a braking request. While the pump motor, etc. are normally operated with electric power of the auxiliary power supply when there is an abnormality in the main power supply, the voltage of the auxiliary power supply is slowly reduced as the pump motor operates, and is largely reduced due to inrush current that flows at the start of the pump motor. Meanwhile, the capacity of the auxiliary power supply is smaller than that of the main power supply. Thus, when the voltage of the auxiliary power supply is largely reduced due to the inrush current, it may become lower than the operation minimum voltage of the hydraulic brake system, and the hydraulic brake system may become unable to operate. On the other hand, in the hydraulic brake system according to the disclosure, the number of times the inrush current flows is reduced, when the main power supply is in the above abnormal condition. Consequently, the voltage of the auxiliary power supply can be made less likely to be lower than the operation minimum voltage, and the hydraulic brake system can be made less likely to be unable to operate.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A hydraulic brake system for a vehicle, as one embodiment, will be described.

Figure 1:
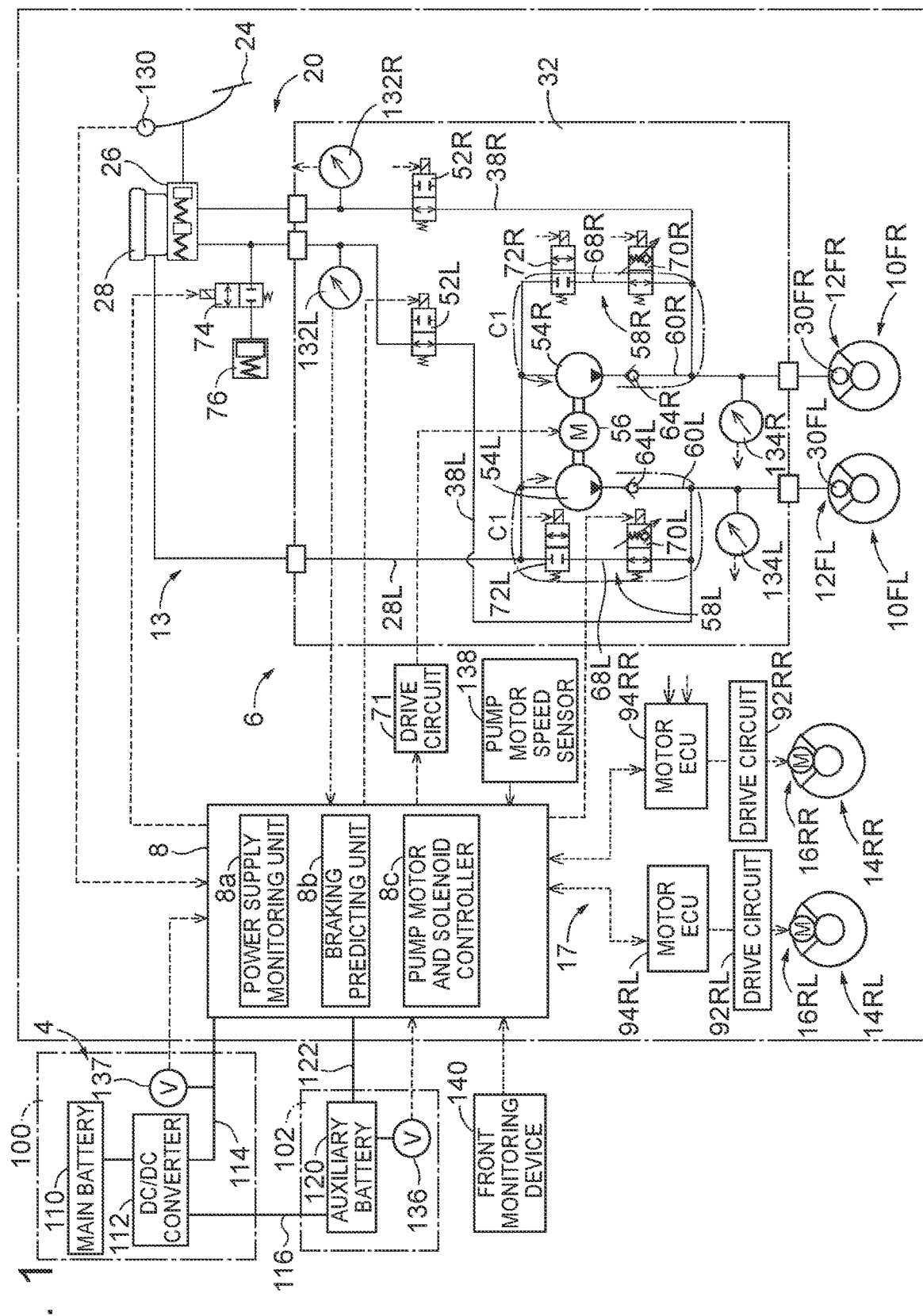
FIG. 1 is a view showing a hydraulic brake system according to a first embodiment.

The hydraulic brake system for the vehicle includes an on-board power supply 4, brake device 6, brake ECU (Electronic Control Unit) 8 that controls the brake device 6, and so forth, as schematically shown in FIG. 1. The brake device 6 includes a hydraulic brake system 13 having hydraulic brakes 12FR, 12FL provided for right and left front wheels 10FR, 10FL, respectively, and an electric brake system 17 having electric brakes 16RR, 16RL provided for right and left rear wheels 14RR, 14RL, respectively.

The hydraulic brake system 13 includes the hydraulic brakes 12FR, 12FL and a fluid pressure generation device 20, and the fluid pressure generation device 20 includes (a) a master cylinder 26 having pressurizing pistons linked with a brake pedal 24 as a brake operation member operated by a driver, (b) a hydraulic control unit 32 provided between the master cylinder 26 and a reservoir 28, and wheel cylinders 30FR, 30FL of the hydraulic brakes 12FR, 12FL, and so forth.

The master cylinder 26 serving as a manual fluid pressure generation device is of a tandem type, and has two pressurizing chambers in front of two pressurizing pistons. In operation, a fluid pressure having a level commensurate with braking force applied to the brake pedal 24 is generated in each of the pressurizing chambers. Master passages 38R, 38L are respectively connected to the two pressurizing chambers of the master cylinder 26, and the pressurizing chambers are connected to the wheel cylinders 30FR, 30FL, via the master passages 38R, 38L. In the following description, letters, such as FR, FL, RR, RL, R, and L, attached to the hydraulic brakes 12FR, 12FL, electric brakes 16RL, 16RR, etc. may be omitted, when they are generally called, or they need not be distinguished from each other in terms of the right front wheel, left front wheel, right rear wheel, left rear wheel, right-side wheels, and left-side wheels.

Figure 2:
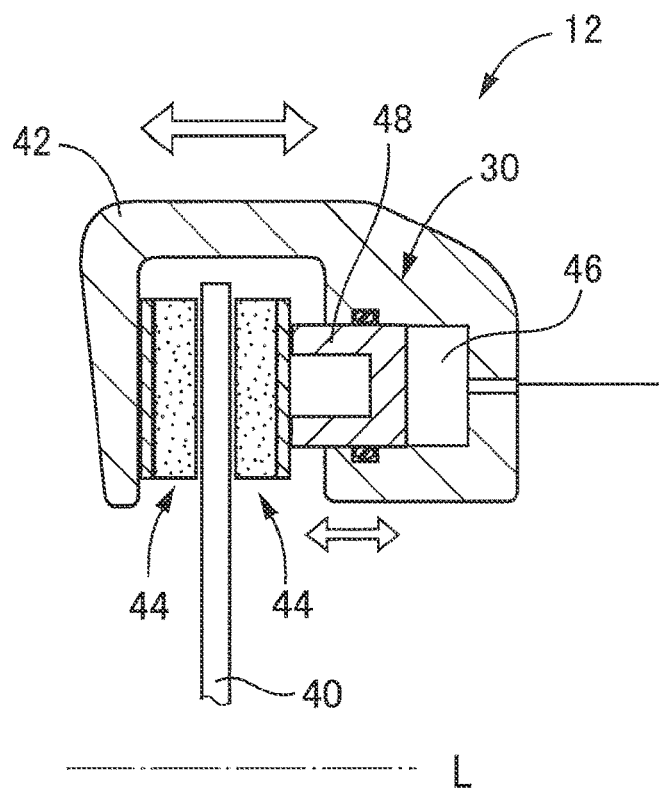
FIG. 2 is a cross-sectional view schematically showing a hydraulic brake included in the hydraulic brake system.

As shown in FIG. 2, the hydraulic brake 12 is a disc brake as a friction brake. The hydraulic brake 12 includes (i) a disc rotor 40 as a brake rotating body that rotates as a unit with each of the right and left front wheels 10FR, 10FL, (ii) a caliper 42 supported by a non-rotating body, such that the caliper 42 is movable in a direction parallel to a rotational axis L of each of the right and left front wheels 10FR, 10FL, (iii) brake pads 44 as a pair of friction members located on the opposite sides of the disc rotor 40, (iv) a wheel cylinder 30 provided inside the caliper 42, and so forth.

When a fluid pressure is supplied to a fluid pressure chamber 46 of the wheel cylinder 30, the piston 48 is moved in a direction parallel to the rotational axis L, and the caliper 42 is also moved. In the following description, the fluid pressure in the fluid pressure chamber 46 of the wheel cylinder 30 may be simply referred to as the fluid pressure of the wheel cylinder 30. As a result, the brake pads 44 are respectively pressed against the disc rotor 40, to be frictionally engaged with the disc rotor 40. In this manner, the hydraulic brake 12 is operated, and hydraulic braking force corresponding to the fluid pressure of the wheel cylinder 30 is applied to each of the right and left front wheels 10FR, 10FL.

The hydraulic control unit 32 includes (1) master shut-off valves 52R, 52L as normally open solenoid valves provided in the master passages 38R, 38L, respectively, (2) pump passages 60R, 60L that connect a reservoir passage 28L connected to the reservoir 28, with portions of the master passages 38R, 38L located downstream of the master shut-off valves 52R, 52L, respectively, (3) two pumps 54R, 54L provided in the pump passages 60R, 60L, respectively, (4) one pump motor 56 that drives the pumps 54R, 54L, (5) solenoid valve devices 58R, 58L corresponding to the wheel cylinders 30FR, 30FL, respectively, and so forth.

As shown in FIG. 1, the master passages 38R, 38L directly connect the master cylinder 26 with the wheel cylinders 30FR, 30FL, without going through the pumps 54R, 54L and the solenoid valve devices 58R, 58L. The pumps 54R, 54L are connected to the wheel cylinders 30FR, 30FL, via the pump passages 60R, 60L and portions of the master passages 38R, 38L, respectively.

The pumps 54R, 54L pump up hydraulic fluid from the reservoir 28, and supply the fluid to the wheel cylinders 30FR, 30FL. On the discharge sides of the pumps 54R, 54L, check valves 64R, 64L are provided for preventing reverse flow of the hydraulic fluid toward the pumps 54R, 54L. In this embodiment, the pumps 54R, 54L are gear pumps, whereby pulsation is reduced. Also, the pump motor 56 is a brushless motor, and is connected to the brake ECU 8 via an inverter 71 as a drive circuit. The pump motor 56 is controlled through control of the inverter 71, so that operation of the pumps 54R, 54L is controlled.

Return passages 68R, 68L are provided for connecting portions of the pump passages 60L, 60R or the master passages 38R, 38L on the discharge side of the pumps 54R, 54L (portions downstream of the check valves 64R, 64L), with portions of the reservoir passage 28L or the pump passages 60R, 60L on the intake side of the pumps 54R, 54L, and the solenoid valve devices 58R, 58L are provided in the return passages 68R, 68L, respectively. Each of the solenoid valve devices 58R, 58L includes a linear valve 70R, 70L as a normally open solenoid valve and a shut-off valve 72R, 72L as a normally closed solenoid valve, which are arranged in series. For example, the shut-off valves 72R, 72L may be provided in portions closer to the reservoir 28 than the linear valves 70R, 70L. The linear valves 70R, 70L can continuously control the fluid pressures of the wheel cylinders 30FR, 30FL, through continuous control of electric current supplied to their solenoids.

A stroke simulator 76 is connected to a portion of the master passage 38L located upstream of the master shut-off valve 52L, via a simulator control valve 74 as a normally closed solenoid valve. The stroke simulator 76 is allowed to operate, when the simulator control valve 74 is placed in an open state.

Figure 3:
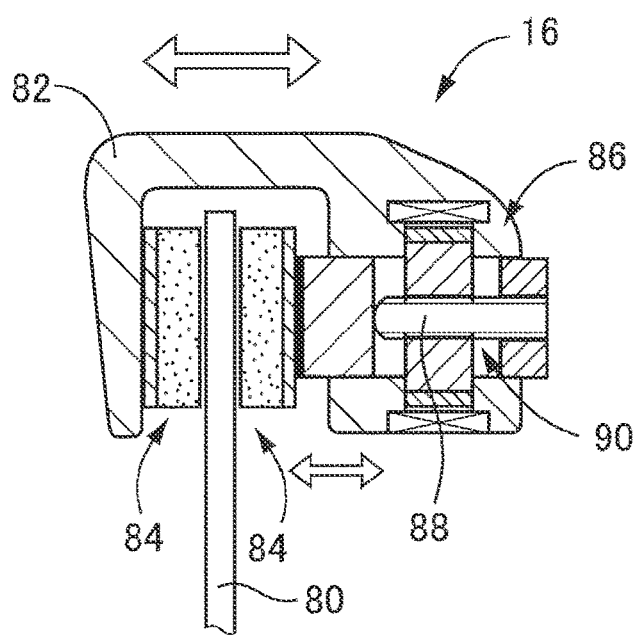
FIG. 3 is a cross-sectional view schematically showing an electric brake included in the hydraulic brake system.

As shown in FIG. 3, each of the electric brakes 16RR, 16RL provided for the right and left rear wheels 14RR, 14RL is a disc brake as a friction brake. The electric brake 16 includes a disc rotor 80, caliper 82, a pair of brake pads 84, motor 86 for brake as an electric motor provided in the caliper 82, and a screw mechanism 90 as a motion conversion mechanism that converts rotation of the motor 86 for brake, into linear movement of a pressing member 88. When the motor 86 for brake is rotated, the pressing member 88 is advanced in a direction parallel to the rotational axis L, and the caliper 82 is moved. As a result, the brake pads 84 are pressed against the disc rotor 80, to be frictionally engaged with the disc rotor 80. In this manner, the electric brake 16 is operated, so that electric braking force is applied to the right and left rear wheels 14RR, 14RL. The motors 86RR, 86RL for brake are respectively connected to motor ECUs 94RR, 94RL, via drive circuits 92RR, 92RL, and are controlled, under control of the motor ECUs 94RR, 94RL, respectively.

Figure 4:
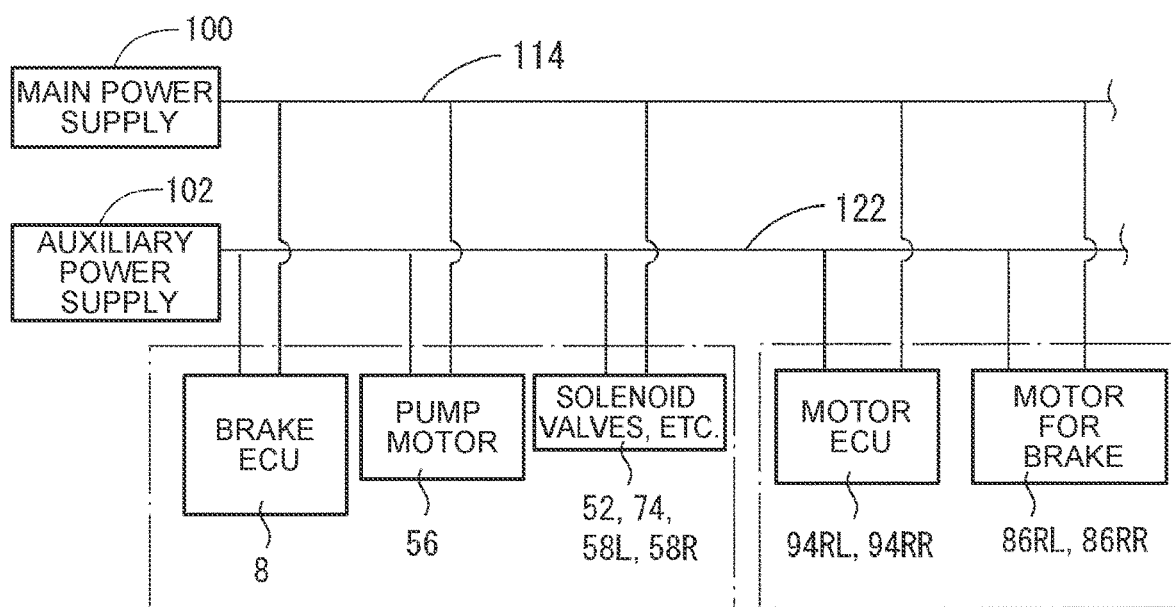
FIG. 4 is a view schematically showing the manner of supplying electric power to the hydraulic brake system.

As shown in FIG. 1 and FIG. 4, the on-board power supply 4 supplies electric power to the brake device 6 (including the pump motor 56, solenoid valves of the master shut-off valves 52, the motors 86 for brake, etc.), brake ECU 8, motor ECUs 94RR, 94RL, and so forth, and includes a main power supply 100 and an auxiliary power supply 102.

The main power supply 100 includes a main battery 110, DC/DC converter 112, and main feeder 114. When a drive source (not shown) of the vehicle includes an electric motor for driving, the main battery 110 is used for supplying electric power to the electric motor for driving, and is charged with power that is regeneratively generated by a motor-generator (not shown) during braking of the vehicle. Also, when the drive source of the vehicle includes an engine, electric power generated through operation of the engine is supplied to the main battery 110, for charging of the main battery 110. The main battery 110 may be a lithium-ion battery, for example.

The DC/DC converter 112 is operable to step down a high voltage (e.g. 207V) from the main battery 110, to a low voltage (e.g., 12V). The voltage of 12V is supplied from the DC/DC converter 112, to the brake device 6, brake ECU 8, motor ECUs 94RR, 94RR, etc. (which may be briefly referred to as "brake device 6, etc."), via the main feeder 114. Also, the auxiliary power supply 102 is connected to the DC/DC converter 112, via a feeder 116 for charge.

The auxiliary power supply 102 includes an auxiliary battery 120, auxiliary feeder 122, and so forth. The auxiliary battery 120 may be a capacitor, for example, and the charging capacity of the auxiliary battery 120 is smaller than that of the main battery 110. Electric power is supplied from the main battery 110 to the auxiliary battery 120, for charging of the auxiliary battery 120. Also, when there is an abnormality in the main power supply 100, for example, electric power is supplied from the auxiliary battery 120 to the brake device 6, etc., via the auxiliary feeder 122.

As shown in FIG. 1, each of the brake ECU 8 and the motor ECUs 94RR, 94RL has a computer as a main component, and includes an executing unit, storage unit, input/output unit, etc., which are not illustrated. The brake ECU 8 includes a power supply monitoring unit 8a, braking predicting unit 8b, pump motor and solenoid controller 8c, and so forth.

To the input/output unit of the brake ECU 8 are connected a stroke sensor 130 that detects the stroke of the brake pedal 24, master cylinder pressure sensors 132R, 132L that detect the fluid pressures of the two pressurizing chambers of the master cylinder 26, respectively, wheel cylinder pressure sensors 134R, 134L that detect the fluid pressures of the wheel cylinders 30FR, 30FL, auxiliary voltage sensor 136 that detects the voltage of the auxiliary power supply 102, main voltage sensor 137 that detects the voltage of the main power supply 100, pump motor speed sensor 138 that detects the rotational speed of the pump motor 56, front monitoring device 140, and so forth. The hydraulic control unit 32 (including the pump motor 56, solenoids of the solenoid valve devices 58R, 58L, etc.) is also connected to the input/output unit of the brake ECU 8. Also, the motor ECUs 94RR, 94RL are connected to the brake ECU 8, such that they can communicate with each other.

The front monitoring device 140 obtains conditions in front of a self-vehicle as the vehicle on which the hydraulic brake system for the vehicle is installed. For example, the front monitoring device 140 includes at least one of a camera and a radar device mounted on a front part of the self-vehicle. The front monitoring device 140 detects an object, etc. present in a region in front of the self-vehicle, based on an image captured by the camera or a signal from the radar device, and obtains the positional relationship between the self-vehicle and a front object as the object present in front of the self-vehicle. The region in front of the self-vehicle includes front side regions thereof, and means a region in which an object, etc. can be detected by the camera or radar device. The region in which an object, etc. can be detected by the camera or radar device often includes front side regions. The above-mentioned object corresponds to, for example, a vehicle other than the self-vehicle, person, wall, building, road sign, or the like. As the positional relationship, a distance between the self-vehicle and the front object (which will be called "inter-vehicle distance" in this specification, though the object may not be a vehicle), relative velocity (which means an approach speed of the self-vehicle relative to the front object), etc. are obtained. The front monitoring device 140 also obtains the content indicated by a road sign present in front of the vehicle, conditions of the road in front of the vehicle (e.g., the presence of a stop line, and a distance to the stop line), and so forth. In the following description, the positional relationship between the self-vehicle and the front object, the content indicated by the road sign, and information representing road conditions, which are obtained by the front monitoring device 140, may be simply called front monitoring information, such as information representing the positional relationship.

The power supply monitoring unit 8a monitors the on-board power supply 4. In this embodiment, the power supply monitoring unit 8a monitors whether the voltage of the main power supply 100 detected by the main voltage sensor 137 is lower than an abnormality determination threshold value. When the voltage of the main power supply 100 is lower than the abnormality determination threshold value, the power supply monitoring unit 8a determines that the main power supply 100 is in an abnormal condition in which it cannot supply electric power to the brake device 6, etc. The abnormality in the main power supply 100 is considered to be caused by a failure of the main battery 110 or DC/DC converter 112, disconnection or breaking of the main feeder 114, etc. When the abnormality is caused by a failure of the main battery 110 or DC/DC converter 112, electric power of the main power supply 100 cannot be supplied to both the auxiliary power supply 102, and the brake device 6, etc. When the abnormality is caused by disconnection of the main feeder 114, electric power is supplied from the main power supply 100 to the auxiliary battery 120 via the feeder 116 for charge, for charging of the auxiliary battery 120; however, the charging speed is slow, and the voltage of the auxiliary power supply 102 is reduced as the brake device 6, etc. operate. In the following description, an abnormality in the main power supply 100, which makes it impossible to supply electric power to the brake device 6, etc., may be simply called "abnormality in the main power supply 100".

The braking predicting unit 8b predicts a possibility of generation of a braking request after a set time (e.g., T sec.), based on the front monitoring information, etc. supplied from the front monitoring device 140. For example, the braking predicting unit 8b can determine, based on the inter-vehicle distance and the approach speed, whether the self-vehicle needs to be braked after the set time T, in view of the relationship with the front object.

The pump motor and solenoid controller 8c controls electric current supplied to the solenoids of the linear valves 70, shut-off valves 72, etc., pump motor 56, and so forth, which are constituent elements of the hydraulic control unit 32. Through control of the hydraulic control unit 32, the fluid pressures of the wheel cylinders 30 can be controlled. Also, when the main power supply 100 is in an abnormal condition, the pump motor 56, solenoid valve devices 58, etc. are controlled, as will be described later.

Operation of the hydraulic brake system for the vehicle constructed as described above will be described. For example, when the brake pedal 24 is depressed, a braking request is generated. In the brake ECU 8, an operating state of the brake pedal 24 (which may be briefly referred to as "brake operating state") is obtained, based on at least one of a detection value of the stroke sensor 130 and detection values of the master cylinder pressure sensors 132R, 132L, and required total braking force as braking force required by the driver is obtained based on the brake operating state.

Also, in the brake ECU 8, a braking request may be generated based on front monitoring information supplied from the front monitoring device 140, for example. In this case, the required total braking force is obtained based on the front monitoring information, etc. For example, the required total braking force may be obtained as a larger value in the case where the inter-vehicle distance to the front object, etc. is short, than that in the case where it is long, and may be obtained as a larger value in the case where the approach speed is fast, than that in the case where the approach speed is slow. Also, the required total braking force may be obtained as a larger value in the case where the distance to the stop line is short, than that in the case where the distance is long.

When the drive source of the vehicle includes an electric motor, and regenerative braking force is applied to drive wheels, required electric braking force Fdt and required hydraulic braking force Fpt are obtained, so that the required total braking force is satisfied by one or more of the regenerative braking force, electric braking force, and hydraulic braking force, and required load Ft and required fluid pressure Pt are obtained based on the required electric braking force Fdt and required hydraulic braking force Fpt. On the other hand, when no regenerative braking force is applied to the drive wheels (such as when the vehicle does not include an electric motor that functions as a drive source, or when the vehicle includes an electric motor that functions as a drive source, but no regenerative braking force is applied), the required load Ft, required fluid pressure Pt, etc. are obtained, so that the required total braking force is satisfied by at least one of the electric braking force and the hydraulic braking force.

When the required hydraulic braking force Fpt and required fluid pressure Pt are larger than zero, a hydraulic braking request as a request to operate the hydraulic brakes 12FR, 12FL is generated, and the brake ECU 8 controls the hydraulic control unit 32. In the hydraulic control unit 32, electric current is supplied to the solenoids, so that the master shut-off valves 52R, 52L are closed, and the simulator control valve 74 is opened, while the shut-off valves 72R, 72L are opened. Also, the pump motor 56 is started, and the pumps 54R, 54L are operated in the same manner. The fluid pressures of the wheel cylinders 30FR, 30FL are controlled, through control of the pump motor 56 and the linear valves 70R, 70L. Since no accumulator is provided in the hydraulic control unit 32, the pump motor 56 is started in response to the hydraulic braking request.

When an abnormality occurs in the main power supply 100, the brake device 6, etc. are operated with electric power supplied from the auxiliary power supply 102. However, the capacity of the auxiliary battery 120 is smaller than that of the main battery 110, as described above. Thus, it is highly necessary to make the voltage of the auxiliary power supply 102 less likely or unlikely to be reduced to be lower than the minimum voltage required to operate the hydraulic brake system (which will be called "system operation minimum voltage"). The system operation minimum voltage is often determined based on voltage required to operate the brake ECU 8, motor ECUs 94, etc., in the hydraulic brake system. In the following, control of the hydraulic control unit 32 when there is an abnormality in the main power supply 100 will be described. Control of the motor 86 for brake is not related to this disclosure, and thus will not be described herein.

Figure 11A:
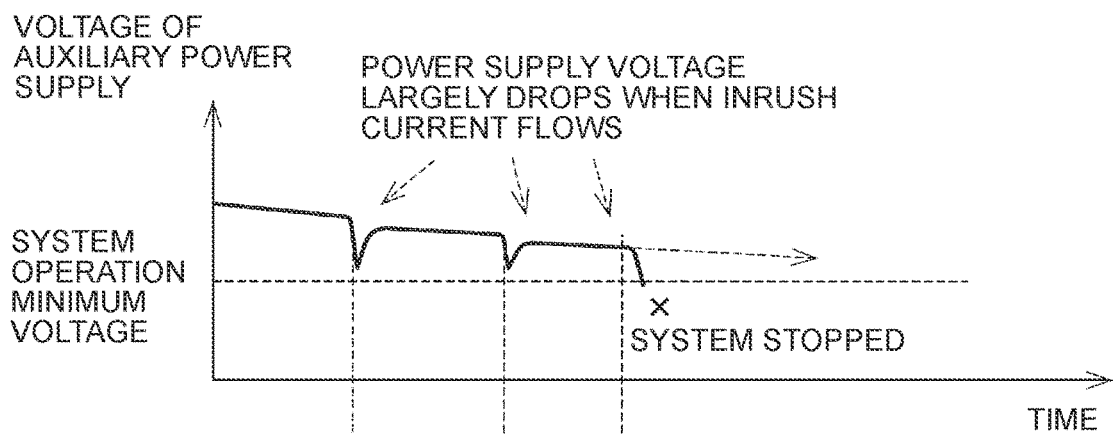
FIG. 11A is a view showing change of voltage of an auxiliary power supply of an on-board power supply that supplies electric power to a known hydraulic brake system.
Figure 11B:
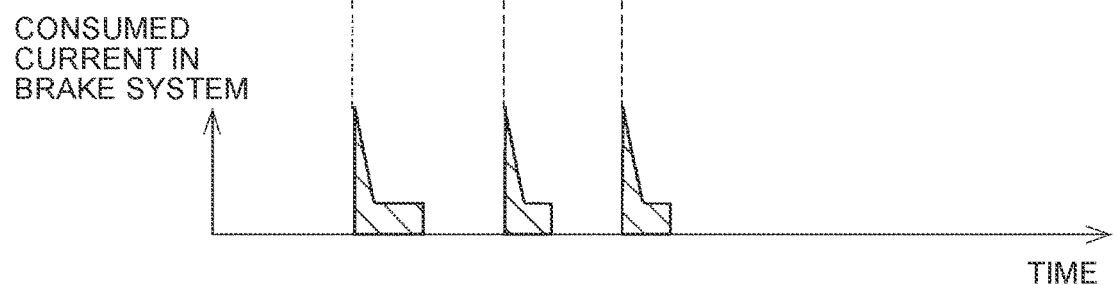
FIG. 11B is a view showing consumed current of the known hydraulic brake system.

While the voltage of the auxiliary power supply 102 is reduced as the pump motor 56, etc. operate, as shown in FIG. 11A and FIG. 11B, it is largely reduced due to inrush current flowing when the pump motor 56 is started. Thus, when the pump motor 56 is started and stopped a plurality of times, the voltage of the auxiliary battery 120 may become lower than the system operation minimum voltage.

Thus, in this embodiment, when an abnormality is detected in the main power supply 100, the number of start and stop of the pump motor 56 is reduced. For example, when an abnormality is detected in the main power supply 100, the pump motor 56 is started, irrespective of the presence or absence of a braking request, and is then continuously operated, irrespective of the presence or absence of a braking request.

When an abnormality is detected in the main power supply 100, the pump motor 56 is not necessarily required to be started immediately, but the voltage of the auxiliary power supply 102 may be used for an on-vehicle device or devices other than the hydraulic brake system. Thus, it is desirable to start the pump motor 56 early, so as to secure a sufficient amount of electric power for operating the pump motor 56.

The pump motor 56 is continuously operated after it is started. Meanwhile, when there is no request for hydraulic braking, the master shut-off valves 52R, 52L are closed, and the shut-off valves 72R, 72L are opened, while the linear valves 70R, 70L are opened. As a result, the hydraulic fluid is pumped up from the reservoir 28 by means of the pumps 54R, 54L, and discharged. The hydraulic fluid discharged from the pumps 54R, 54L is returned to the pumps 54R, 54L, via the pump passages 60R, 60L, and return passages 68R, 68L. Thus, a circulation circuit C1 including the pump 54R, 54L, pump passage 60R, 60L, and return passage 68R, 68L is formed, and the hydraulic fluid circulates through the circulation circuit C1.

Thus, when there is no request for hydraulic braking, the hydraulic brakes 12FR, 12FL are favorably prevented from being operated. Also, since the reservoir 28 is in communication with the circulation circuit C1, the fluid pressure of the hydraulic fluid circulating through the circulation circuit C1 can be made close to the atmospheric pressure. Further, since the master shut-off valves 52 are closed, the hydraulic fluid discharged from the pumps 54 is favorably prevented from being supplied to the master cylinder 26, and the driver is prevented from feeling strange or uncomfortable. In this connection, control of the pump motor 56 or control of the pump motor 56, linear valves 70, etc. when there is no request for hydraulic braking may be called "standby-time control".

Under the standby-time control, a substantially constant current In with which the pump motor 56 can rotate at a predetermined set speed is supplied to the pump motor 56. The set speed (which may be called "standby-time speed") and the current In may be determined such that, when a request for hydraulic braking is generated, during standby-time control of the pump motor 56, the fluid pressures of the wheel cylinders 30 are immediately increased, upon switching of the shut-off valves 72 to the closed state, so that a set braking force (of about 0.3 Mpa, for example) can be generated.

Then, when a request for hydraulic braking is generated, the pump motor 56 and the linear valves 70R, 70L are controlled, according to the required hydraulic braking force Fpt, namely, the required fluid pressure Pt. The fluid pressures of the hydraulic fluid discharged from the pumps 54R, 54L are controlled by the linear valves 70R, 70L, and supplied to the wheel cylinders 30FR, 30FL, so that the hydraulic brakes 12FR, 12FL are actuated. Through control of the pump motor 56 and the linear valves 70R, 70L, the actual fluid pressures of the wheel cylinders 30FR, 30FL are made closer to the required fluid pressure Pt, and the actual hydraulic braking force is made closer to the required hydraulic braking force Fpt. In this connection, the fluid pressures of the wheel cylinders 30FR, 30FL may be controlled, through control of either of the pump motor 56, and the linear valves 70R, 70L.

Even when there is no request for hydraulic braking, after release of the hydraulic brakes 12FR, 12FL, the pump motor 56 continues to be operated. The rotational speed of the pump motor 56 is controlled to the standby-time speed, for example, and the current In is supplied to the pump motor 56. Also, it is desirable that the pump motor 56 is continuously operated, until the vehicle is stopped, or until the vehicle is switched to a condition where it can be safely stopped (for example, a state of manual driving by the driver, rather than an automated driving state). When the brake operation member 24 is depressed by the driver, in the manual driving state, the hydraulic brakes 12 can be actuated with the fluid pressure of the master cylinder 26.

Figure 6:
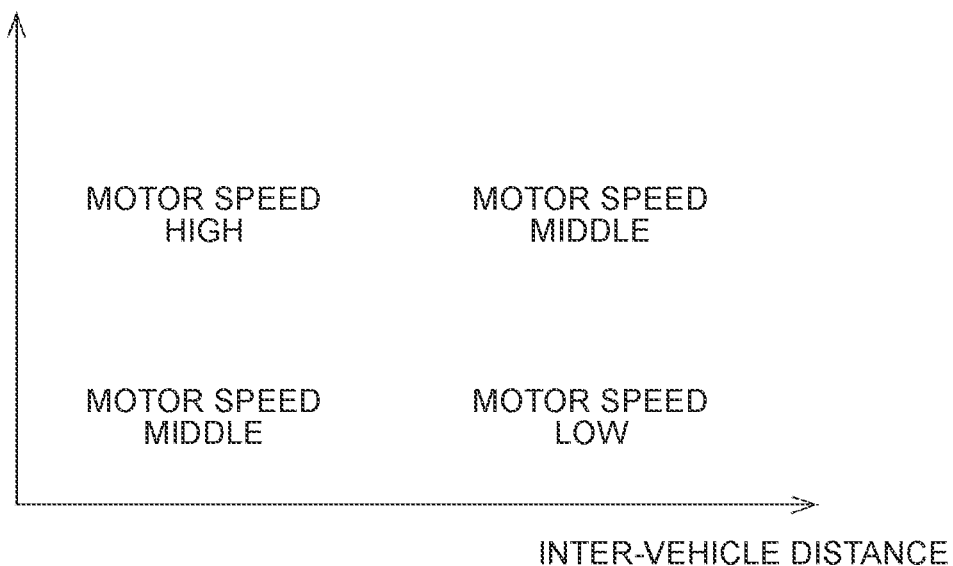
FIG. 6 is a view showing a rotational speed determination map stored in the storage unit.

On the other hand, in the case where there is an abnormality in the main power supply 100, and there is no request for hydraulic braking, when it is predicted that a braking request will be generated after a set time, the pump motor 56 can be controlled, based on front monitoring information supplied from the front monitoring device 140. For example, when a braking request is predicted to be generated after the set time, the rotational speed of the pump motor 56 is determined, based on the map of FIG. 6. When the inter-vehicle distance is short, or the approach speed is fast, at a given point in time, the rotational speed of the pump motor 56 is controlled to a larger value, as compared with the case where the inter-vehicle distance is long, or the approach speed is slow. When the inter-vehicle distance is short, or the approach speed is fast, it is predicted that the required hydraulic braking force, when a request for hydraulic braking is generated, is large, and the rate of increase of the required hydraulic braking force is large. It is thus appropriate to increase the rotational speed of the pump motor 56 in advance.

Figure 5:
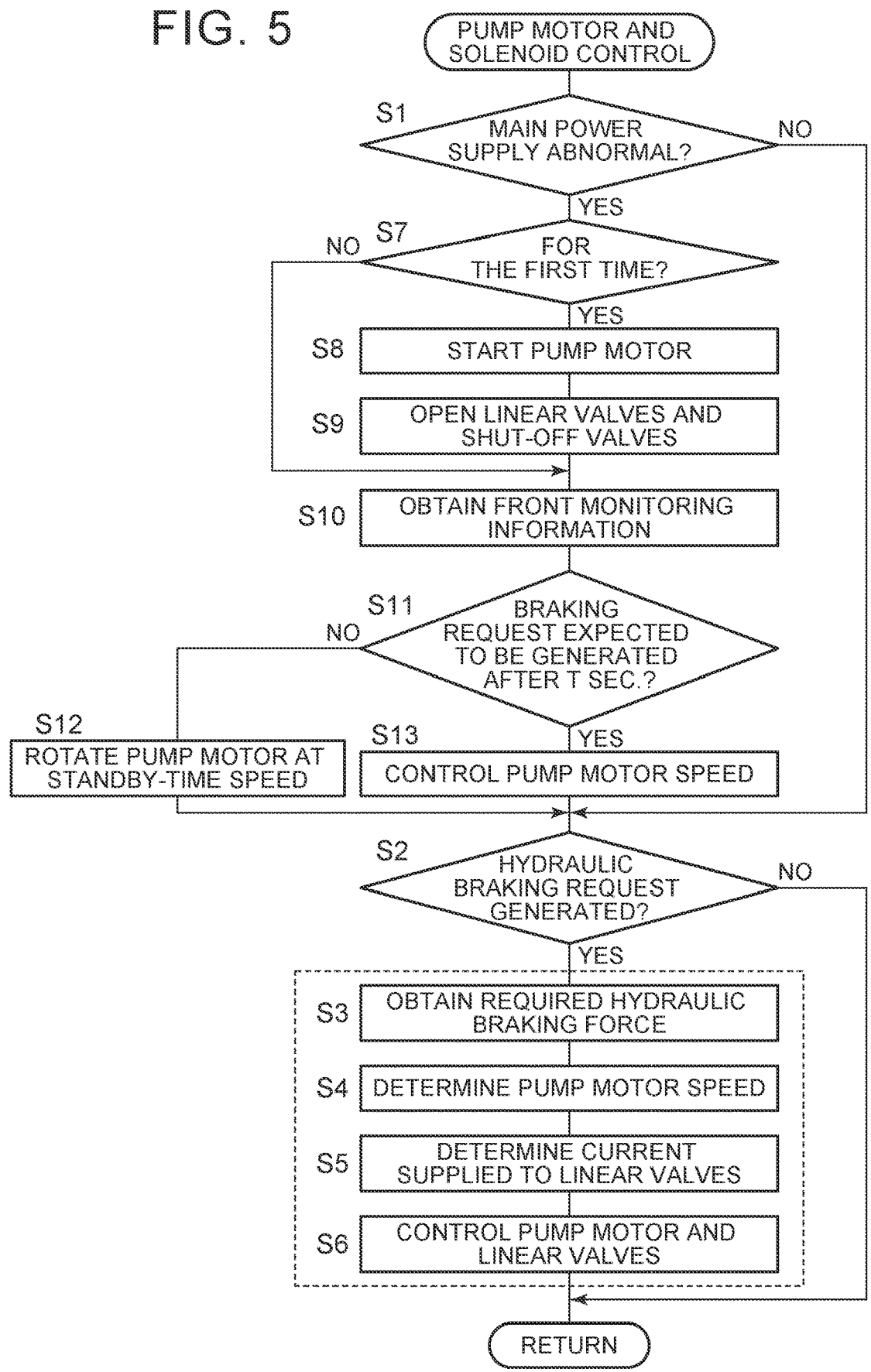
FIG. 5 is a flowchart schematically illustrating a pump motor and solenoid control program stored in a storage unit of a brake ECU of the hydraulic brake system.

A pump motor and solenoid control program illustrated in the flowchart of FIG. 5 is executed at intervals of a predetermined cycle time. In step S1, it is determined whether there is an abnormality in the main power supply 100. When a negative decision (NO) is obtained in step S1, it is determined in step S2 whether there is a request for hydraulic braking. When a negative decision (NO) is obtained in step S2, steps S1, S2 are repeatedly executed. Then, when a negative decision (NO) is obtained in step S1, and an affirmative decision (YES) is obtained in step S2, steps S3 to S6 are executed. Steps S3 to S6 are executed in the same manner, no matter whether the main power supply 100 is in a normal condition or abnormal condition. In step S3, the required hydraulic braking force Fpt, required fluid pressure Pt, etc. are obtained, based on the brake operating state or the front monitoring information. In step S4, the target rotational speed of the pump motor 56 is obtained, based on the required fluid pressure Pt, etc. In step S5, currents supplied to the linear valves 70R, 70L are obtained. Then, in step S6, the master shut-off valves 52R, 52L are closed, and the shut-off valves 72R, 72L are opened, while the simulator control valve 74 is opened. Also, the pump motor 56 and the linear valves 70R, 70L are controlled.

On the other hand, when an affirmative decision (YES) is obtained in step S1, it is determined in step S7 whether the affirmative decision (YES) obtained in step S1 is the first affirmative decision, in other words, whether a negative decision (NO) was obtained in step S1 in the last cycle. When an affirmative decision (YES) is obtained in step S7, step S8 and step S9 are executed in which the pump motor 56 is started, and the linear valves 70R, 70L and shut-off valves 72R, 72L are opened, while the master shut-off valves 52R, 52L are closed. As a result, the circulation circuits C1 are formed, and the hydraulic fluid discharged from the pumps 54R, 54L is circulated through the circulation circuits C1. The front monitoring information, etc. are obtained in step S10, and it is determined in step S11 whether there is a possibility of generation of a braking request after the set time, based on the front monitoring information. When a negative decision (NO) is obtained in step S11, the rotational speed of the pump motor 56 is controlled to the standby-time speed in step S12.

When the next cycle of this program is executed, an affirmative decision (YES) is obtained in step S1, and a negative decision (NO) is obtained in step S7. Thus, steps S8, S9 are skipped, and steps S1, S7, S10 to S12, and S2 are repeatedly executed. The pump motor 56 is rotated at the standby-time speed, and the hydraulic fluid circulates through the circulation circuits C1. When it is predicted that a request for hydraulic braking may be generated after the set time while steps S1, S7, S10 to S12, and S2 are repeatedly executed, an affirmative decision (YES) is obtained in step S11. In step S13, the rotational speed of the pump motor 56 is controlled, according to the map of FIG. 6, based on the front object monitoring information.

Then, steps S1, S7, S10, S11, S13, and S2 are repeatedly executed, and steps S3 to S6 are executed when an affirmative decision (YES) is obtained in step S2. In this case, in step S3, the required hydraulic braking force Fpt, required fluid pressure Pt, etc. are obtained based on the front monitoring information, and the fluid pressures of the wheel cylinders 30FR, 30FL are controlled.

Figure 7:
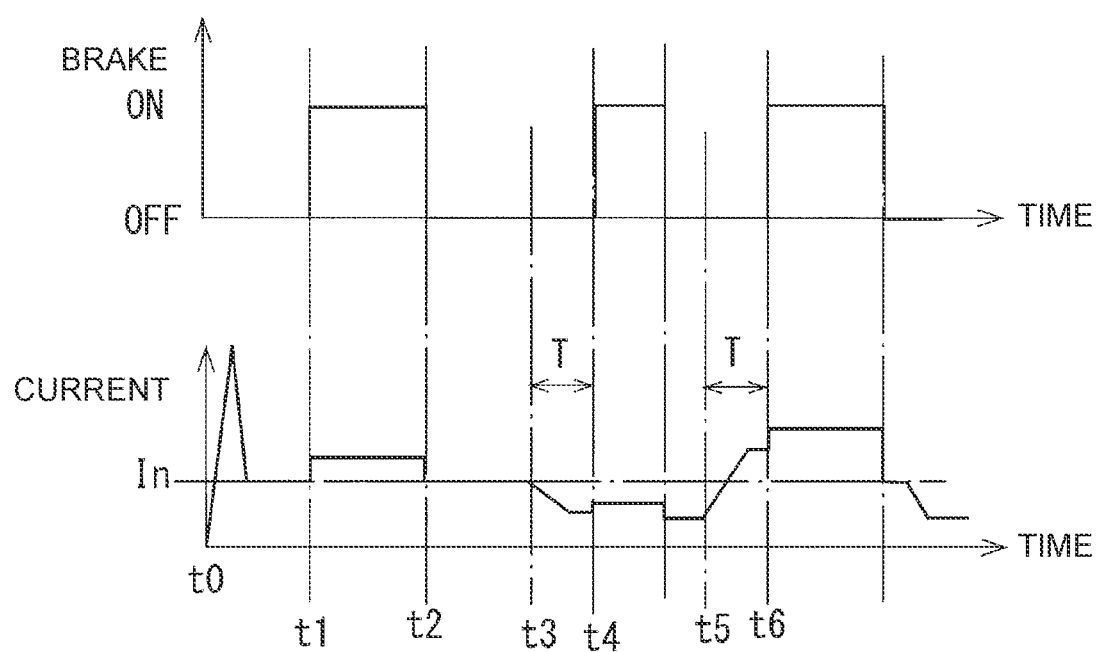
FIG. 7 is a view showing change of electric current flowing in a pump motor when the program of FIG. 5 is executed.

In this embodiment, change of electric current in the pump motor 56 is shown in FIG. 7. When an abnormality in the main power supply 100 is detected at time to, the pump motor 56 is started. As a result, inrush current flows, but then converges or settles. It is possible to suppress the inrush current (this control will be called "inrush current suppression control"), by reducing the rate of increase of the rotational speed at the start of the pump motor 56, for example. However, if a request for hydraulic braking is generated when the pump motor 56 is started, actuation of the hydraulic brakes 12FR, 12FL may be delayed. Also, since the inrush current flows only once at the start of the pump motor 56, the need to perform the inrush current suppression control is deemed low. In view of the above situation, in this embodiment, the inrush current suppression control is not performed when the pump motor 56 is started. However, the inrush current suppression control may be performed when the pump motor 56 is started.

When a request for hydraulic braking is generated at time t1, steps S3 to S6 are executed in which the pump motor 56 and the linear valves 70R, 70L are controlled, according to the required fluid pressure Pt. The fluid pressures of the wheel cylinders 30FR, 30FL are made close to the required fluid pressure Pt. When the request for hydraulic braking ceases to be generated at time t2, the current supplied to the pump motor 56 is kept at a substantially constant current In, and the pump motor 56 is rotated at a substantially constant standby-time speed.

At time t3, it is predicted that a request for hydraulic braking will be generated after the set time. The rotational speed of the pump motor 56 is controlled based on the map of FIG. 6. When the request for hydraulic braking is generated at time t4, the rotational speed of the pump motor 56 and the linear valves 70R, 70L are controlled based on the required fluid pressure Pt, etc. Also, it is predicted at time t5 that a request for hydraulic braking will be generated after the set time, and the rotational speed of the pump motor 56 is controlled based on the front monitoring information. At time t5, the approach speed is higher, and the inter-vehicle distance is shorter, than those at time t3; therefore, the rotational speed of the pump motor 56 is increased. Then, when a request for hydraulic braking is generated at time t6, the fluid pressures of the wheel cylinders 30FR, 30FL are made close to the required fluid pressure Pt, through control of the rotational speed of the pump motor 56 and electric currents supplied to the linear valves 70R, 70L.

Figure 8A:
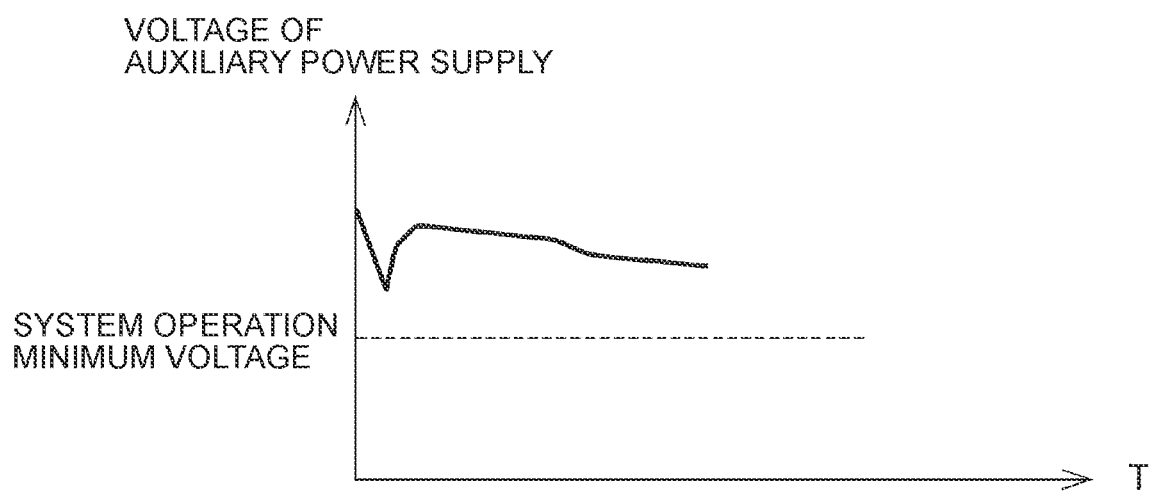
FIG. 8A is a view showing change of voltage of an auxiliary power supply of an on-board power supply that supplies electric power to the hydraulic brake system.
Figure 8B:
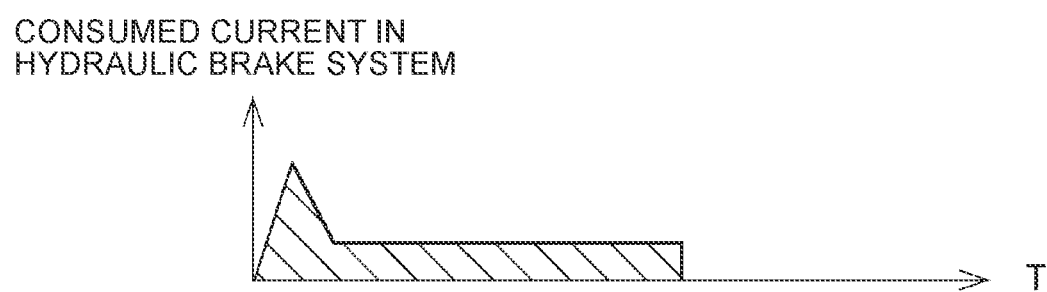
FIG. 8B is a view showing consumed current of the hydraulic brake system.

Also, change of the voltage of the auxiliary power supply 102 in this embodiment is shown in FIG. 8A. As shown in FIG. 8A, the voltage of the auxiliary power supply 102 is largely reduced at the start of the pump motor 56 when an abnormality in the main power supply 100 is detected, and then increased. Then, the voltage of the auxiliary power supply 102 is gradually reduced with increase of operation time of the pump motor 56. Meanwhile, a hatched area in FIG. 8B represents electric power consumed in the pump motor 56 (the hydraulic brake system). The power consumption in this embodiment is usually larger than power consumption in the known hydraulic brake system for the vehicle shown in FIG. 11B. However, in the hydraulic brake system according to this embodiment, the number of times the inrush current flows is reduced, as compared with the case of the known hydraulic brake system. Thus, the voltage of the auxiliary power supply 102 can be made less likely to be largely reduced, and the voltage of the auxiliary power supply 102 can be made less likely to be lower than the system operation minimum voltage.

In the above embodiment, the rotational speed of the pump motor 56 is determined, based on the inter-vehicle distance and approach speed included in the front monitoring information. However, the rotational speed of the pump motor 56 may be determined in view of the traveling speed of the self-vehicle, for example.

Figure 9:
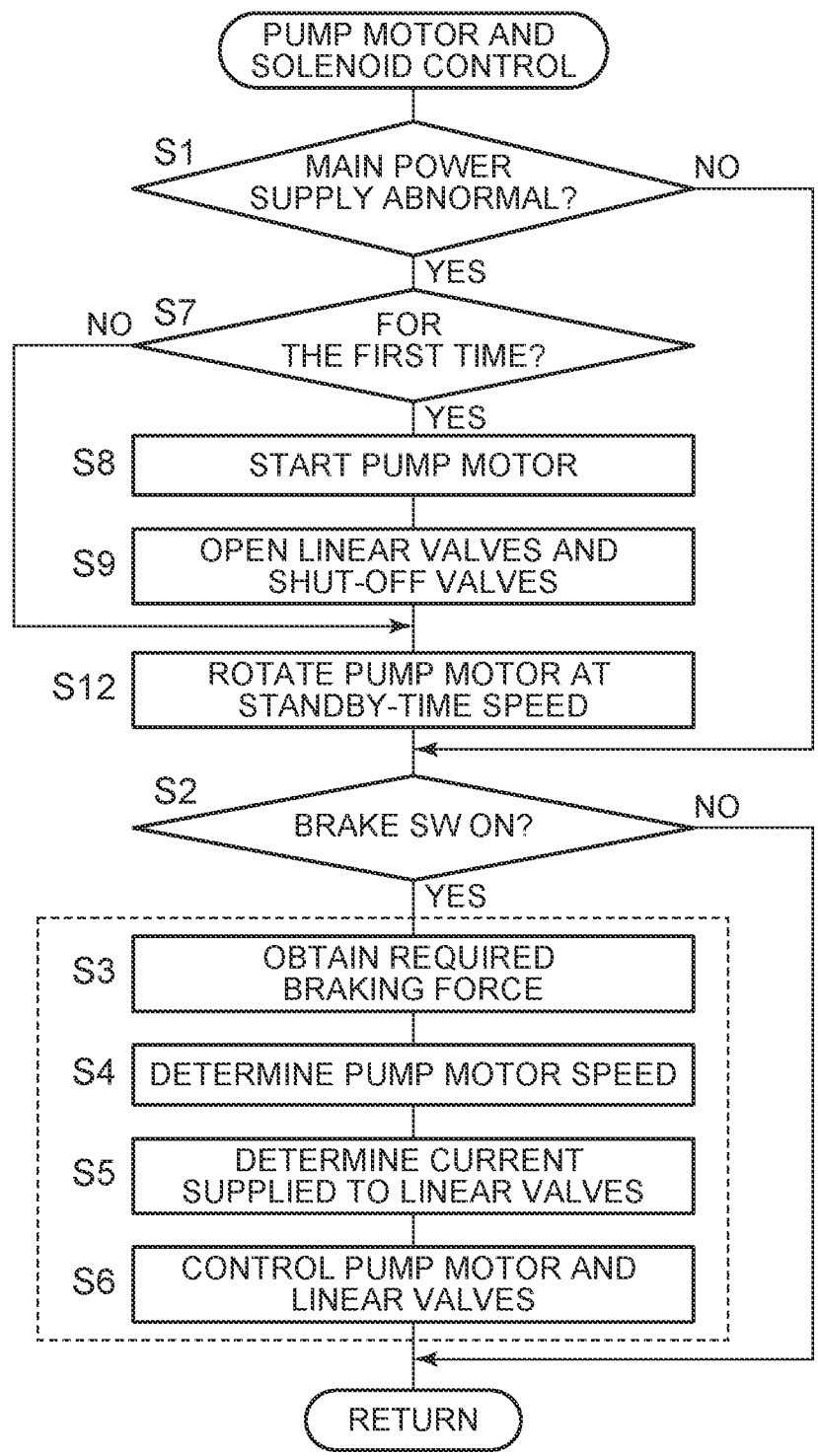
FIG. 9 is a flowchart illustrating another pump motor and solenoid control program stored in the storage unit.
Figure 10:
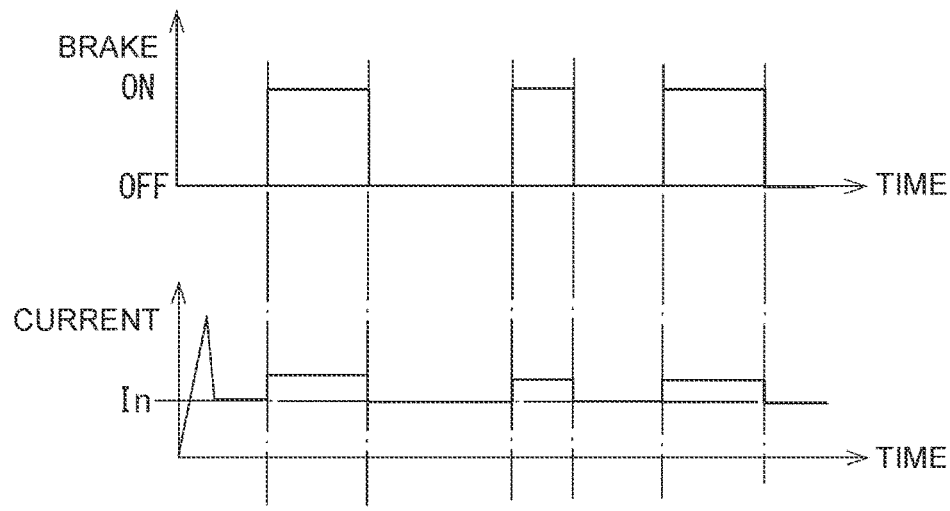
FIG. 10 is a view showing change of electric current flowing in the pump motor when the program of FIG. 9 is executed.

This disclosure may also be applied to a vehicle that is not equipped with the front monitoring device 140, or a vehicle in which hydraulic control is not performed based on the front monitoring information from the front monitoring device 140. One example of this case is shown in FIG. 9 and FIG. 10. The pump motor and solenoid control program illustrated in the flowchart of FIG. 9 does not include steps S10, S11, S13 of the pump motor and solenoid control program illustrated in the flowchart of FIG. 5. When an abnormality in the main power supply 100 is detected, the pump motor 56 is started, the circulation circuits C1 are formed, and the rotational speed of the pump motor 56 is controlled to the standby-time speed, in steps S7 to S9, and S12. The hydraulic fluid discharged from the pumps 54R, 54L circulates through the circulation circuits C1.

In this case, as shown in FIG. 10, the pump motor 56 is started when an abnormality in the main power supply 100 is detected, and the rotational speed of the pump motor 56 is kept substantially constant (standby-time speed) while there is no request for hydraulic braking. Then, when a request for hydraulic braking is generated, the pump motor 56 and the linear valves 70R, 70L are controlled, based on the required fluid pressure Pt. In this embodiment, too, the voltage of the auxiliary power supply 102 can be made less likely to be reduced to be lower than the system operation minimum voltage.

Thus, in this embodiment, the pump motor 56 is a brushless motor; therefore, while no request for hydraulic braking is generated, the rotational speed can be controlled to the standby-time speed, or can be controlled to a speed level determined based on the front monitoring information, for example. Also, since the pump motor 56 is rotated when the master shut-off valves 52R, 52L are in the closed state, the hydraulic fluid discharged from the pumps 54R, 54L can be favorably prevented from being supplied to the master cylinder 26. As a result, when there is no request for hydraulic braking, the driver is less likely or unlikely to feel strange or uncomfortable, even if the pump motor 56 is in operation.

Further, in this embodiment, the auxiliary power supply 102 is used even when there is an abnormality in the main power supply 100. Therefore, the fluid pressures of the wheel cylinders 30FR, 30FL can be made higher than that of the master cylinder 26, so that the braking force of the driver can be assisted.

When there is an abnormality in the main power supply 100, the number of times the pump motor 56 is started may be made smaller than the number of times of starting when the main power supply 100 is in normal operation. For example, the pump motor 56 is continuously operated, while the request for hydraulic braking is generated a set number of times (e.g., three times), and is stopped when the third request for hydraulic braking ceases to be generated. Then, the pump motor 56 is started when the fourth request for hydraulic braking is generated. In this embodiment, too, the number of times the inrush current flows is reduced, as compared with the case where the main power supply 100 is in normal operation; therefore, the voltage of the auxiliary power supply 102 can be made less likely to be reduced to be lower than the system operation minimum voltage.

Also, in the above embodiment, the disclosure is practiced in a condition where there is an abnormality in the main power supply 100, and the pump motor 56, etc. are operated with electric power supplied from the auxiliary power supply 102. However, the disclosure may also be practiced when the voltage of the main power supply 100 is lower than a normal-time voltage and higher than an abnormality determination threshold value, for example, in a condition where the pump motor 56, etc. are operated with electric power of the main power supply 100.

As described above, in this embodiment, a portion of the brake ECU 8 which stores steps S1 to S13 of the pump motor and solenoid control program illustrated in the flowchart of FIG. 5, or steps S1 to S12 of the pump motor and solenoid control program illustrated in the flowchart of FIG. 9, and a portion of the brake ECU 8 which executes these steps, provide a controller. Also, a portion of the brake ECU 8 which stores step S11 of the pump motor and solenoid control program illustrated in the flowchart of FIG. 5, a portion that executes this step, etc. provide a braking predicting unit. The braking predicting unit 8b corresponds to a braking predicting unit, and the front monitoring device 140 corresponds to a positional relationship obtaining device.

The structure of the hydraulic brake system for the vehicle may be selected as desired. For example, the disclosure may be applied to a hydraulic brake system for a vehicle as shown in FIG. 12

Figure 12:
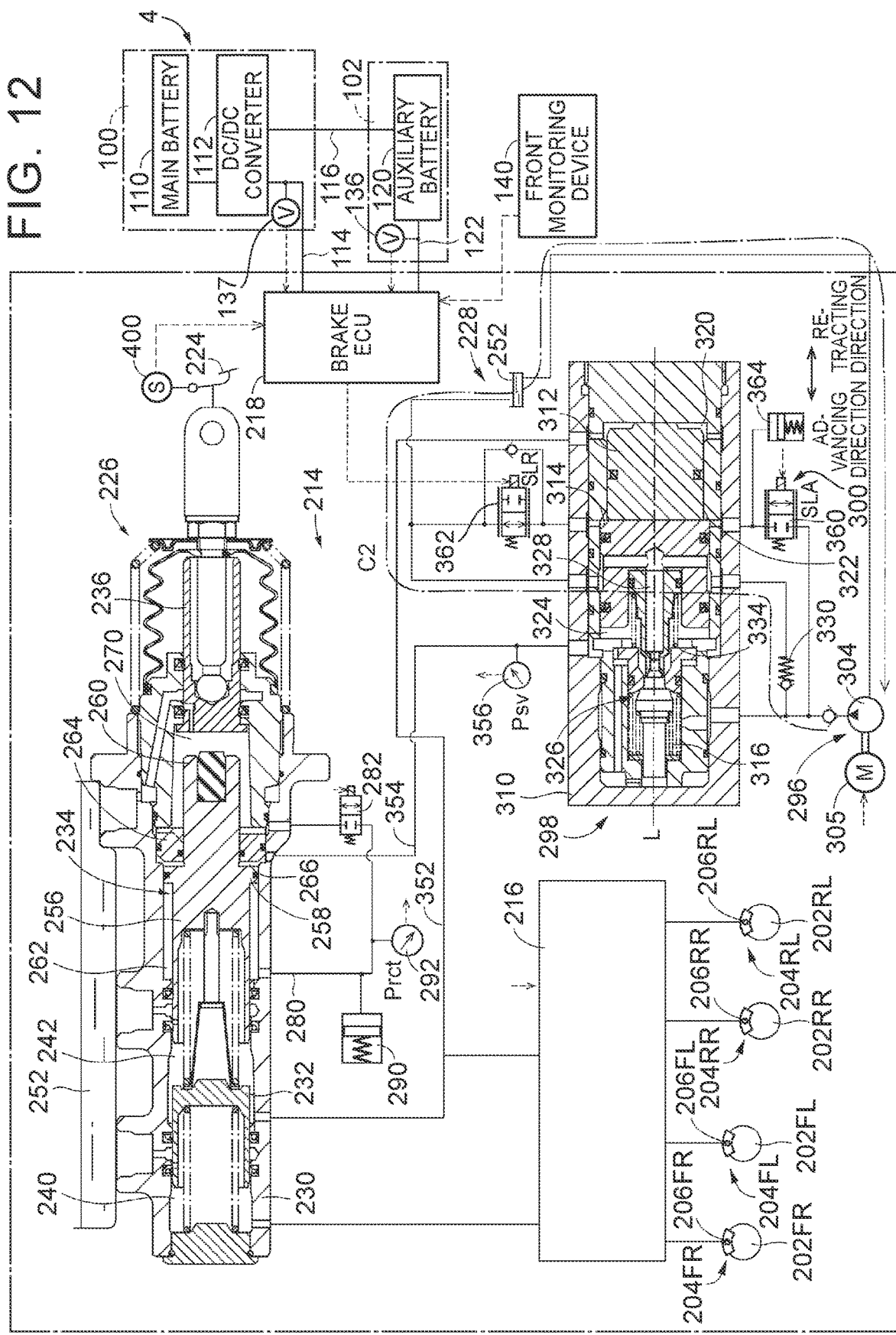
FIG. 12 is a view schematically showing a hydraulic brake system for a vehicle according to a second embodiment.

As shown in FIG. 12, the hydraulic brake system for the vehicle includes no electric brake system, and four wheels, i.e., front and rear, right and left wheels, are provided with hydraulic brakes. The hydraulic brake system for the vehicle includes (i) wheel cylinders 206FR, 206FL, 206RR, 206RL of hydraulic brakes 204FR, 204FL, 204RR, 204RL provided for the front and rear, right and left wheels 202FR, 202FL, 202RR, 202RL, respectively, (ii) a fluid pressure generation device 214 that can supply fluid pressures to the wheel cylinders 206FR, 206FL, 206RR, 206RL, (iii) a slip control valve device 216 provided between the wheel cylinders 206FR, 206FL, 206RR, 206RL and the fluid pressure generation device 214, and so forth. The fluid pressure generation device 214, slip control valve device 216, etc. are controlled by a brake ECU 218 having a computer as a main component. In the following description, when the hydraulic brakes, etc. need not be distinguished from each other in terms of the wheel position, or when they are generally called, the letters FR, FL, RR, RL indicating the wheel positions may be omitted.

The fluid pressure generation device 214 includes (i) a master cylinder 226, (ii) a back fluid pressure controller 228 that controls the fluid pressure of a back chamber of the master cylinder 226, and so forth. The master cylinder 226 has a housing 230, pressurizing pistons 232, 234 that are arranged in series and fluid-tightly and slidably fitted in the housing 230, input piston 236, and so forth. The master cylinder 226 also has pressurizing chambers 240, 242 located in front of the pressurizing pistons 232, 234, respectively. The wheel cylinders 206FR, 206FL of the right front and left front wheels 202FR, 202FL are connected to the pressurizing chamber 240, and the wheel cylinders 206RR, 206RL of the right rear and left rear wheels 202RR, 202RL are connected to the pressurizing chamber 242. When a fluid pressure is supplied to each of the wheel cylinders 206, the hydraulic brakes 204 are actuated, and rotation of the wheels 202 is curbed.

The pressurizing piston 234 includes (a) a front piston portion 256 provided in a front portion thereof, (b) an intermediate piston portion 258 that is provided in an intermediate portion, and protrudes in radial directions, and (c) a rear small-diameter portion 260 that is provided in a rear portion, and has a smaller diameter than the intermediate piston portion 258. The front piston portion 256 and the intermediate piston portion 258 are fluid-tightly and slidably fitted in the housing 230, and the pressurizing chamber 242 is formed in front of the front piston portion 256, while an annular chamber 262 is formed in front of the intermediate piston portion 258. On the other hand, the housing 230 is provided with an annular, radially inner projection 264, and the rear small-diameter portion 260 is fluid-tightly and slidably fitted in the radially inner projection 264. As a result, a back chamber 266 is formed behind the intermediate piston portion 258, between the intermediate piston portion 258 and the radially inner projection 264. The input piston 236 is located behind the pressurizing piston 234, and a spacing chamber 270 is formed between the rear small-diameter portion 260 and the input piston 236. A brake pedal 224 as a brake operation member is linked with a rear portion of the input piston 236.

The annular chamber 262 and the spacing chamber 270 are connected by a connecting passage 280, and a communication control valve 282 is provided in the connecting passage 280. The communication control valve 282 is a normally closed solenoid valve. A stroke simulator 290 is connected to a portion of the connecting passage 280 which is closer to the annular chamber 262 than the communication control valve 282. Also, a fluid pressure sensor 292 is provided in a portion of the connecting passage 280 which is closer to the annular chamber 262 than the communication control valve 282. The fluid pressure sensor 292 detects the fluid pressure of the annular chamber 262 and spacing chamber 270, in a condition where the annular chamber 262 and the spacing chamber 270 are communicated with each other. The fluid pressure of the annular chamber 262 and spacing chamber 270 has a level commensurate with the operating force applied to the brake pedal 224; thus, the fluid pressure sensor 292 may be called "operating fluid pressure sensor".

The back fluid pressure controller 228 is connected to the back chamber 266. The back fluid pressure controller 228 includes (a) a pump device 296, (b) a regulator 298, (c) a solenoid valve device 300, and so forth. The pump device 296 includes a pump 304 and a pump motor 305. The pump motor 305 is a brushless motor.

The regulator 298 includes (d) a housing 310, and (e) a pilot piston 312 and a control piston 314 that are arranged in series with each other, in a direction parallel to an axis L. Also, a high-pressure chamber 316 is formed in front of the control piston 314 in the housing 310, and is connected to the pump device 296. Also, a pilot pressure chamber 320 is formed between the pilot piston 312 and the housing 310, and a control chamber 322 is formed behind the control piston 314, while a servo chamber 324 as an output chamber is formed in front of the control piston 314. Also, a high-pressure supply valve 326 is provided between the servo chamber 324 and the high-pressure chamber 316. The high-pressure supply valve 326 is a normally closed valve, and normally disconnects the servo chamber 324 from the high-pressure chamber 316.

A low-pressure passage 328 is formed in the control piston 314. A reservoir 252 is connected to the low-pressure passage 328, and a discharge part of the pump 304 is connected to the low-pressure passage 328 via a relief valve 330. Also, the low-pressure passage 328 includes a portion that extends generally in parallel with the axis L. The portion of the low-pressure passage 328 extending in parallel with the axis is open to a front end portion of the control piston 314, and is opposed to the high-pressure supply valve 326. Therefore, when the control piston 314 is at a retracted end position, the servo chamber 324 is disconnected from the high-pressure chamber 316, and is communicated with the reservoir 252 via the low-pressure passage 328. When the control piston 314 is advanced, the servo chamber 324 is disconnected from the reservoir 252, and the high-pressure supply valve 326 is opened and communicated with the high-pressure chamber 316. Reference numeral 334 denotes a spring that biases the control piston 314 in the retracting direction.

The pilot pressure chamber 320 is connected to the pressurizing chamber 242 of the master cylinder 226 via a pilot passage 352. Also, the back chamber 266 of the master cylinder 226 is connected to the servo chamber 324, via a servo passage 354. Since the servo chamber 324 and the back chamber 266 are directly connected to each other, the servo pressure as the fluid pressure of the servo chamber 324 and the fluid pressure of the back chamber 266 are at the same level in principle. The servo pressure is detected by a servo pressure sensor 356 provided in the servo passage 354. The solenoid valve device 300, which is able to control the fluid pressure of the control chamber 322, includes a pressure-increasing linear valve (SLA) 360 provided between the control chamber 322 and the pump device 296, and a pressure-reducing linear valve (SLR) 362 provided between the control chamber 322 and the reservoir 252. The fluid pressure of the control chamber 322 is controlled by controlling electric current to a solenoid of the pressure-increasing linear valve 360 and a solenoid of the pressure-reducing linear valve 362. Also, a damper 364 is connected to the control chamber 322, and the hydraulic fluid is supplied and received between the control chamber 322 and the damper 364.

In this embodiment, a relationship determined based on the structure of the regulator 298, etc. is established between the fluid pressure of the control chamber 322 and the servo pressure as the fluid pressure of the servo chamber 324, and a relationship determined based on the structure of the master cylinder 226, etc. is established between the fluid pressure of the back chamber 266 and the fluid pressures of the pressurizing chambers 240, 242. Accordingly, the fluid pressure of the servo chamber 324 is controlled by controlling the fluid pressure of the control chamber 322, and the fluid pressures of the wheel cylinders 206 are controlled by controlling the fluid pressures of the pressurizing chambers 240, 242.

The slip control valve device 216 is able to individually control the fluid pressures of the wheel cylinders 206 of the front and rear, right and left wheels 202, and includes a plurality of solenoid valves, and so forth.

The brake ECU 218 has a computer as a main component, and includes an executing unit, storage unit, input/output unit, etc. which are not illustrated in the drawings. The brake ECU 218 includes a power supply monitoring unit, braking predicting unit, pump motor and solenoid controller, etc. (not shown), as in the above embodiment. The front monitoring device 140, the above-mentioned operating fluid pressure sensor 292, and servo pressure sensor 356 are connected to the brake ECU 218, and a stroke sensor 400 that detects the stroke (which may be called "operation stroke") of the brake pedal 224 is connected to the brake ECU 218, while the pressure-increasing linear valve 360, pressure-reducing linear valve 362, pump motor 305, etc. are connected to the brake ECU 218, via drive circuits (not shown).

Figure 13:
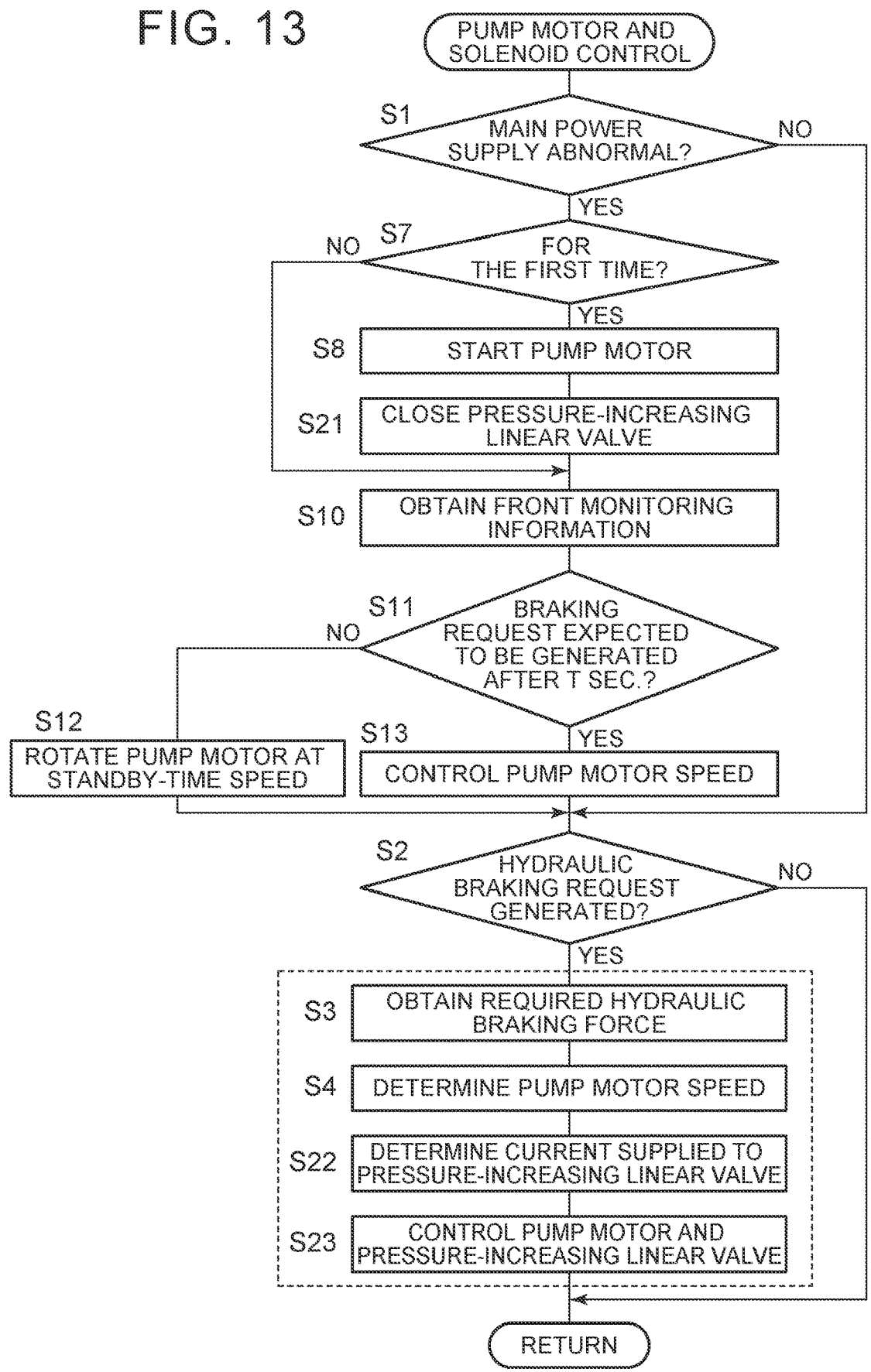
FIG. 13 is a flowchart illustrating a pump motor and solenoid control program stored in a storage unit of a brake ECU of the hydraulic brake system for the vehicle.

In this embodiment, a pump motor and solenoid control program illustrated in the flowchart of FIG. 13 is executed. In the flowchart of FIG. 13, the same step numbers are assigned to the same steps as those of the flowchart of FIG. 5. When a request for hydraulic braking is generated, the pump motor 305 is started, and the pressure-increasing linear valve 360, pressure-reducing linear valve 362, and pump motor 305 are controlled, in steps S3, S4, S22, and S23. The fluid pressure of the control chamber 322 is controlled, by controlling the pressure-increasing linear valve 360 and the pressure-reducing linear valve 362, using the hydraulic fluid discharged from the pump 304. The control piston 314 is advanced, and a fluid pressure is generated in the servo chamber 324, and supplied to the back chamber 266. In the master cylinder 226, the fluid pressures of the pressurizing chambers 240, 242 are controlled, and supplied to the wheel cylinders 206.

When an abnormality in the main power supply 100 is detected for the first time, the pump motor 305 is started in step S8, and the pressure-increasing linear valve 360 is closed in step S21. The fluid pressure of the hydraulic fluid discharged from the pump 304 becomes higher than the valve-opening pressure of the relief valve 330, and the relief valve 330 is opened. The hydraulic fluid discharged from the pump 304 is returned to the reservoir 252 via the low-pressure passage 328, and is pumped up by the pump 304. As a result, a circulation circuit C2 including the pump 304, relief valve 330, low-pressure passage 328, and reservoir 252 is formed, and the hydraulic fluid is circulated through the circulation circuit C2. Since no fluid pressure is supplied to the control chamber 322, the control piston 314 is not advanced, and the regulator 298 is placed in a stopped state.

Thus, in this embodiment, too, the voltage of the auxiliary power supply 102 is less likely to be reduced when an abnormality occurs in the main power supply 100, and the life of the auxiliary battery 120 can be prolonged, as in the case of the above embodiment.

In the second embodiment, the circulation circuit C2 is formed when there is an abnormality in the main power supply 100, and no request for braking is generated. However, a circulation circuit including the pump 304, pressure-increasing linear valve 360, control chamber 322, pressure-reducing linear valve 362, and reservoir 252 may be formed, for example. Thus, the disclosure is not limited to the above embodiments, but may be embodied in various forms, with various changes and improvements, based on the knowledge of those skilled in the art.

In the following paragraphs, subject matters of the appended claims, and other subject matters of the disclosure, will be listed by way of example.

(1) A hydraulic brake system including: a plurality of wheel cylinders of hydraulic brakes respectively provided for a plurality of wheels of a vehicle, a fluid pressure generation device operable to generate a fluid pressure and supply the fluid pressure to the wheel cylinders, the fluid pressure generation device including at least one pump, and at least one pump motor that drives the at least one pump, a controller configured to control the fluid pressure of the wheel cylinders by controlling the fluid pressure generation device, and an on-board power supply operable to supply electric power to at least the fluid pressure generation device, the on-board power supply including a main power supply and an auxiliary power supply, wherein the fluid pressure generation device is operated with electric power supplied from the auxiliary power supply, when the main power supply is in an abnormal condition in which the main power supply is unable to supply electric power to at least the fluid pressure generation device, the controller is configured to start the at least one pump motor in response to a braking request, when the main power supply is in a normal condition, and the controller is configured to continuously operate the at least one pump motor, irrespective of the presence of the braking request, when the main power supply is in the abnormal condition. The pump or pumps may be directly connected to the wheel cylinders, or may be connected to the wheel cylinders, via solenoid valves, regulator, master cylinder, etc. The pump motor corresponds to each of at least one pump, and one pump motor may be provided for one pump, or one pump motor may be provided in common for two or more pumps. The controller may control the fluid pressures of the wheel cylinders, by controlling at least one of the constituent elements of the fluid pressure generation device. To the fluid pressure generation device, the main power supply and the auxiliary power supply are connected in parallel with each other, and electric power is supplied from the auxiliary power supply to the fluid pressure generation device in the case where electric power is not supplied from the main power supply. Also, electric power of the on-board power supply is supplied to the controller having a computer as a main component, and a drive circuit.

(2) The hydraulic brake system described in paragraph (1), wherein the fluid pressure generation device includes a solenoid valve device including one or more solenoid valves operable to control the fluid pressure of a hydraulic fluid discharged from the at least one pump, and the controller is configured to control the solenoid valve device, so as to form a circulation circuit including the at least one pump, when the main power supply is in the abnormal condition, and the braking request is not generated. In the hydraulic brake system described in this paragraph, when the main power supply is in an abnormal condition in which it cannot supply electric power to at least the fluid pressure generation device, both the pump motor and the solenoid valve device are controlled. Also, since the circulation circuit including the pump is formed, the fluid pressure discharged from the pump motor is less likely or unlikely to be supplied to the wheel cylinders. Also, the circulation circuit thus formed may include a low-pressure source in which the hydraulic fluid is stored at the atmospheric pressure, or the circulation circuit may communicate with the low-pressure source. As a result, the fluid pressure of the hydraulic fluid flowing in the circulation circuit may be made close to the atmospheric pressure. The solenoid valve device may include solenoid valves that are respectively located between discharge parts of two or more pumps and two or more wheel cylinders, or may include solenoid valves which are respectively located between discharge parts of two or more pumps and a low-pressure source, or may include a solenoid valve located between a discharge part of one pump and a control chamber.

(3) The hydraulic brake system described in paragraph (1) or (2), wherein the controller is configured to control a rotational speed of the at least one pump motor to a predetermined set speed, when the main power supply is in the abnormal condition, and the braking request is not generated. It is desirable that the set speed is at such a level that the fluid pressures of the wheel cylinders can be quickly increased when a braking request is generated. The control of the pump motor when no braking request is generated may be called "standby-time control", and the set speed may be called "standby-time speed".

(4) The hydraulic brake system described in any one of paragraphs (1) to (3), wherein the vehicle includes a positional relationship obtaining device that obtains a positional relationship between a self-vehicle as the vehicle, and a front object as an object located in front of the self-vehicle, the controller includes a braking predicting unit configured to predict whether the braking request is generated after a lapse of a set time, based on information representing the positional relationship obtained by the positional relationship obtaining device, and the controller is configured to control the at least one pump motor, based on the positional relationship obtained by the positional relationship obtaining device, when the main power supply is in the abnormal condition, and the braking predicting unit predicts that the braking request is generated after the lapse of the set time. The magnitude of the required braking force, the rate of increase of the required braking force, etc. in the case where a braking request is generated can be predicted, based on the positional relationship between the self-vehicle and the front object. Thus, it is appropriate to control the rotational speed of the pump motor in advance to such a level at which the rate of increase of the required braking force, and the required braking force can be quickly achieved, before the braking request is generated. The positional relationship obtaining device may be considered as a constituent element of the hydraulic brake system.

(5) The hydraulic brake system described in paragraph (4), wherein the positional relationship obtaining device obtains an inter-vehicle distance between the front object and the self-vehicle, and a relative velocity of the self-vehicle relative to the front object, and the controller controls the rotational speed of the pump motor to a larger value in the case where the inter-vehicle distance is short, than that in the case where the inter-vehicle distance is long, and controls the rotational speed of the pump motor to a larger value in the case when an approach speed as the relative velocity is fast, than that in the case where the approach speed is slow. The positional relationship obtaining device may include a camera, radar device, or the like.

(6) The hydraulic brake system described in any one of paragraphs (1) to (5), wherein the controller is configured to start the at least one pump motor when the abnormal condition of the main power supply is detected. For example, when the voltage of the main power supply is lower than an abnormality determination threshold value, it can be determined that the main power supply is in an abnormal condition in which it cannot supply electric power to the fluid pressure generation device. It is also possible to start the pump motor when a braking request is generated for the first time, after the abnormal condition of the main power supply is detected. Also, the pump motor may be rotated until a predetermined end condition is satisfied. The end condition may be that the vehicle is stopped, or that the vehicle is in a condition where it can be safely stopped, for example.

(7) The hydraulic brake system described in any one of paragraphs (1) to (6), further comprising a main voltage sensor that detects a voltage of the main power supply, wherein the controller includes a power supply monitoring unit that determines that the main power supply is in the abnormal condition in which the main power supply is unable to supply electric power to at least the fluid pressure generation device, when a detected value of the main power supply is lower than an abnormality determination threshold value.

(8) The hydraulic brake system described in any one of paragraphs (1) to (7), wherein the fluid pressure generation device includes a plurality of pumps as the at least one pump, and one common pump motor that drives the pumps, as the at least one pump motor, and the pumps are directly connected to the wheel cylinders, respectively.

(9) The hydraulic brake system described in paragraph (2), wherein the fluid pressure generation device includes a plurality of pumps as the at least one pump, and one common pump motor that drivers the pumps, as the at least one pump motor, and the pumps are directly connected to the wheel cylinders, respectively, while the one or more solenoid valves are located between each of the pumps and a low-pressure source.

(10) The hydraulic brake system described in paragraph (9), wherein the fluid pressure generation device includes a master cylinder having a pressurizing piston linked with a brake operation member, and master shut-off valves as a plurality of solenoid valves provided in fluid passages that connect the master cylinder with respective discharge parts of the pumps, and the controller switches the master shut-off valves to closed states, when the circulation circuit is formed. The hydraulic fluid discharged from the pumps is prevented from being returned to the master cylinder, and the driver is less likely or unlikely to feel strange or uncomfortable.

(11) The hydraulic brake system as described in any one of paragraphs (1) to (9), wherein the fluid pressure generation device includes a master cylinder having a pressurizing piston, a pressurizing chamber in front of the pressurizing piston, to which the wheel cylinders are connected, and a back chamber located behind the pressurizing piston, and a back fluid pressure control device connected to the back chamber and operable to control a fluid pressure of the back chamber, the back fluid pressure control device includes a control piston that is operable using a fluid pressure of a control chamber, a regulator provided in front of the control piston and having a servo chamber connected to the back chamber, a pump device having the one pump that is connected to the control chamber and pumps up a hydraulic fluid of the reservoir, and one pump motor that drives the pump, a pressure-increasing control valve as a solenoid valve provided between the pump device and the control chamber, and a pressure-reducing control valve as a solenoid valve provided between the control chamber and the reservoir, and the controller controls the pump motor, and controls at least one of the pressure-increasing control valve and the pressure-reducing control valve, so as to control the fluid pressure of the control chamber, control the fluid pressure of the servo chamber, and control the fluid pressure of the pressurizing chamber of the master cylinder. It may be considered that the solenoid valve device is constituted by the pressure-increasing control valve, pressure-reducing control valve, etc. in the form of solenoid valves.

(12) The hydraulic brake system described in paragraph (2), wherein the fluid pressure generation device includes a first passage that connects a discharge part of the pump to the reservoir, via the solenoid valve device, and a second passage that connects the discharge part of the pump to the reservoir, via a relief valve, while bypassing the solenoid valve device, and the controller controls the solenoid valve device, when the main power supply is in the abnormal condition, and the braking request is not generated, so as to form a circulation circuit including the pump, the second passage, and the reservoir.

(13) A hydraulic brake system including: a plurality of wheel cylinders of hydraulic brakes respectively provided for a plurality of wheels of a vehicle, a fluid pressure generation device operable to generate a fluid pressure and supply the fluid pressure to the wheel cylinders, the fluid pressure generation device including at least one pump, and at least one pump motor that drives the at least one pump, a controller configured to control the fluid pressure of the wheel cylinders by controlling the fluid pressure generation device, and an on-board power supply operable to supply electric power to at least the fluid pressure generation device, the on-board power supply including a main power supply and an auxiliary power supply, wherein the fluid pressure generation device is operated with electric power supplied from the auxiliary power supply, when the main power supply is in an abnormal condition in which the main power supply is unable to supply electric power to at least the fluid pressure generation device, the controller is configured to start the at least one pump motor in response to a braking request, when the main power supply is in a normal condition, and the controller is configured to reduce the number of times of stop and start of the at least one pump motor when the main power supply is in the abnormal condition, as compared with that in a case where the main power supply is in a normal condition. The hydraulic brake system described in this paragraph may adopt a technical feature or features described in any one of paragraphs (1) to (10). For example, when the main power supply is in the above abnormal condition, the pump motor may be continuously operated, or may be continuously operated while two or more braking requests are generated (in other words, the pump motor may be started every two or more times).

(14) An electric actuator control device that controls an electric actuator adapted to operate with electric power of an on-board power supply as a power supply installed on a vehicle, the electric actuator control device including a normal-time controller that starts the electric actuator in response to a braking request, when the on-board power supply is in a normal condition, and an abnormal-time controller that continuously operates the electric actuator, irrespective of the presence of the braking request, when the on-board power supply is in an abnormal condition. The electric actuator control device described in this paragraph may adopt a technical feature or features described in any of paragraphs (1) to (13). Also, the electric actuator control device may be used in the case where the voltage of the on-board power supply is reduced to be lower than that in a normal case, or the case where the on-board power supply does not include a main power supply and an auxiliary power supply, for example. In the above embodiments, the pump motor and the solenoids of the solenoid valves correspond to the electric actuator.

What is claimed is:

1. A hydraulic brake system comprising:
a plurality of wheel cylinders of hydraulic brakes respectively provided for a plurality of wheels of a vehicle;
a fluid pressure generation device operable to generate a fluid pressure and supply the fluid pressure to the wheel cylinders, the fluid pressure generation device including at least one pump, and at least one pump motor that drives the at least one pump;
a controller configured to control the fluid pressure of the wheel cylinders by controlling the fluid pressure generation device; and
an on-board power supply operable to supply electric power to at least the fluid pressure generation device, the on-board power supply including a main power supply and an auxiliary power supply, wherein
the fluid pressure generation device is operated with electric power supplied from the auxiliary power supply, when the main power supply is in an abnormal condition in which the main power supply is unable to supply electric power to at least the fluid pressure generation device,
the controller is configured to start the at least one pump motor in response to a braking request, when the main power supply is in a normal condition, and
the controller is configured to start the at least one pump motor that is in a stopped state even when there is no braking request in a case where the abnormal condition of the main power supply is detected, and to continuously operate the at least one pump motor after starting the at least one pump motor that was in the stopped state when the main power supply is in the abnormal condition,
wherein:
the vehicle includes a positional relationship obtaining device that obtains a positional relationship, the positional relationship including a distance between a self-vehicle as the vehicle, and a front object as an object located in front of the self-vehicle and a relative velocity that is an approach speed of the self-vehicle to the front object;
the controller includes a braking predicting unit configured to determine whether the self-vehicle needs to be braked after a lapse of a set time, based on the distance and the relative velocity obtained by the positional relationship obtaining device; and
the controller is configured to control the at least one pump motor, based on the distance and the relative velocity obtained by the positional relationship obtaining device, when the main power supply is in the abnormal condition, and the braking predicting unit determines that the self-vehicle needs to be braked after the lapse of the set time, wherein:
the controller is configured to control a rotational speed of the at least one pump motor to a speed determined based on the distance and the relative velocity obtained by the positional relationship obtaining device when the main power supply is in the abnormal condition and the braking predicting unit determines that the self-vehicle needs to be braked; and the controller is configured to control the rotational speed of the at least one pump motor to a standby-time speed set in advance when the main power supply is in the abnormal condition and the braking predicting unit determines that the self-vehicle needs to be braked.

2. A hydraulic brake system comprising:

a plurality of wheel cylinders of hydraulic brakes respectively provided for a plurality of wheels of a vehicle;

a fluid pressure generation device operable to generate a fluid pressure and supply the fluid pressure to the wheel cylinders, the fluid pressure generation device including at least one pump, and at least one pump motor that drives the at least one pump;

a controller configured to control the fluid pressure of the wheel cylinders by controlling the fluid pressure generation device; and an on-board power supply operable to supply electric power to at least the fluid pressure generation device, the on-board power supply including a main power supply and an auxiliary power supply, wherein the fluid pressure generation device is operated with electric power supplied from the auxiliary power supply, when the main power supply is in an abnormal condition in which the main power supply is unable to supply electric power to at least the fluid pressure generation device, the controller is configured to start the at least one pump motor in response to a braking request, when the main power supply is in a normal condition, and the controller is configured to start the at least one pump motor that is in a stopped state even when there is no braking request in a case where the abnormal condition of the main power supply is detected, and to reduce the number of times of stop and start of the at least one pump motor after starting the at least one pump motor that was in the stopped state when the main power supply is in the abnormal condition, as compared with that in a case where the main power supply is in the normal condition, wherein:

the vehicle includes a positional relationship obtaining device that obtains a positional relationship, the positional relationship including a distance between a self-vehicle as the vehicle, and a front object as an object located in front of the self-vehicle and a relative velocity that is an approach speed of the self-vehicle to the front object;

the controller includes a braking predicting unit configured to determine whether the self-vehicle needs to be braked after a lapse of a set time, based on the distance and the relative velocity obtained by the positional relationship obtaining device; and the controller is configured to control the at least one pump motor, based on the distance and the relative velocity obtained by the positional relationship obtaining device, when the main power supply is in the abnormal condition, and the braking predicting unit determines that the self-vehicle needs to be braked after the lapse of the set time, wherein:

the controller is configured to control a rotational speed of the at least one pump motor to a speed determined based on the distance and the relative velocity obtained by the positional relationship obtaining device when the main power supply is in the abnormal condition and the braking predicting unit determines that the self-vehicle needs to be braked; and the controller is configured to control the rotational speed of the at least one pump motor to a standby-time speed set in advance when the main power supply is in the abnormal condition and the braking predicting unit determines that the self-vehicle needs to be braked.

\* \* \* \* \*